United States Patent [19]

Dussinger et al.

[11] Patent Number: 5,568,218
[45] Date of Patent: Oct. 22, 1996

[54] LENS CLAMPING LIGHT-BAFFLE IN CAMERA ASSEMBLAGE

[75] Inventors: Thomas E. Dussinger, Henrietta; David C. Smart, Rochester, both of N.Y.

[73] Assignee: Eastman Kodak Company, Rochester, N.Y.

[21] Appl. No.: 597,751

[22] Filed: Feb. 7, 1996

[51] Int. Cl.$^6$ ..................................................... G03B 17/02
[52] U.S. Cl. ........................................... 396/529; 396/535
[58] Field of Search ..................................... 354/288, 286

[56] References Cited

U.S. PATENT DOCUMENTS 5,241,338  8/1993  Luther .................................. 354/288
5,381,200  1/1995  Takagai .............................. 354/288
5,461,444  10/1995  Okura et al. ......................... 354/386

*Primary Examiner*—A. A. Mathews
*Attorney, Agent, or Firm*—Roger A. Fields

[57] ABSTRACT

A camera assemblage comprise a taking lens, a body section having a chamber and a front lens opening for the taking lens which is open to the chamber, and a light-baffle including a forward wall having an exposure opening and a plurality of baffle panels pivotably connected to the front wall for folding to fit the light-baffle into the chamber with the exposure opening behind the front lens opening. The forward wall is positioned to press the taking lens against the body section to clamp the taking lens within the chamber between the front lens opening and the exposure opening when the light-baffle is fit into the chamber.

7 Claims, 3 Drawing Sheets

LENS CLAMPING LIGHT-BAFFLE IN CAMERA ASSEMBLAGE

FIELD OF THE INVENTION

The invention relates generally to the field of photography, and in particular to a lens clamping light-baffle in a camera assemblage.

BACKGROUND OF THE INVENTION

It is known for a size-110 camera to comprise a plastic main body section having a rectangular exposure chamber and a centered front lens opening that is open to the chamber, and a plastic light-baffle including a forward rectangular wall having a centered exposure opening and four side baffle panels. The four side baffle panels are pivotably connected to the respective peripheral edges of the forward wall via integral living hinges, to permit the baffle panels to be folded 90 degrees from being generally co-planar with the forward wall, to fit the light-baffle snugly into the chamber with the exposure opening immediately behind the front lens opening. A two-element taking lens is positioned in the front lens opening, outside the chamber. A protuberance on one of the folded panels is received in a cavity in one wall of the chamber to secure the light-baffle within the chamber.

SUMMARY OF THE INVENTION

A camera assemblage comprising a taking lens, a body section having a chamber and a front lens opening for the taking lens which is open to the chamber, and a light-baffle including a forward wall having an exposure opening and a plurality of baffle panels pivotably connected to the front wall for folding to fit the light-baffle into the chamber with the exposure opening behind the front lens opening, is characterized in that:

the forward wall includes means for pressing the taking lens against the body section to clamp the taking lens within the chamber between the front lens opening and the exposure opening when the light-baffle is fit into the chamber.

DETAILED DESCRIPTION OF THE INVENTION

The invention is disclosed as being embodied preferably in a photographic camera. Because the features of a photographic camera are generally known, the description which follows is directed in particular only to those elements forming part of or cooperating directly with the disclosed embodiment. It is to be understood, however, that other elements may take various forms known to a person of ordinary skill in the art.

Figure 1:
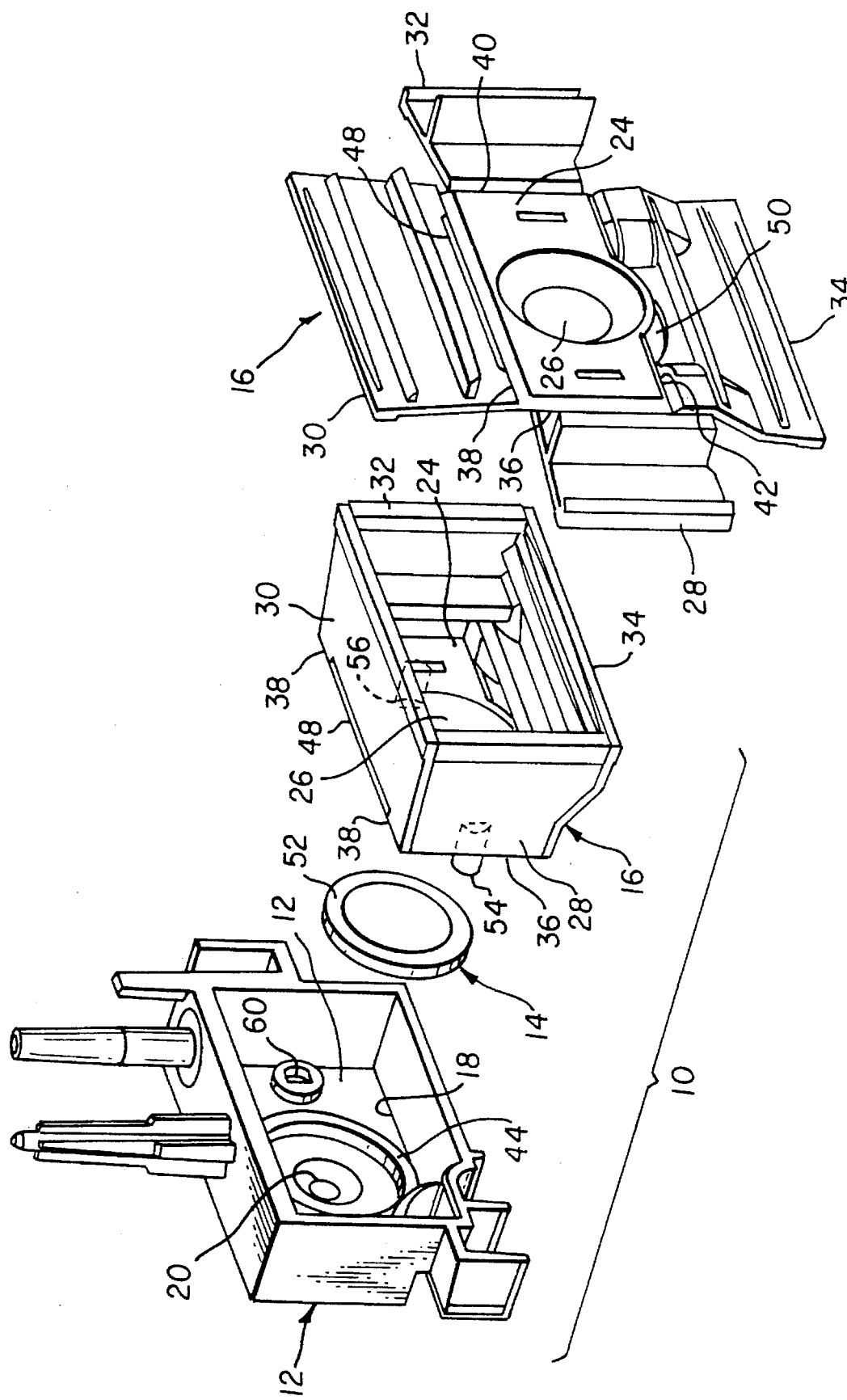
FIG. 1 is a front exploded perspective view of the camera assemblage according to a preferred embodiment of the invention.
Figure 2:
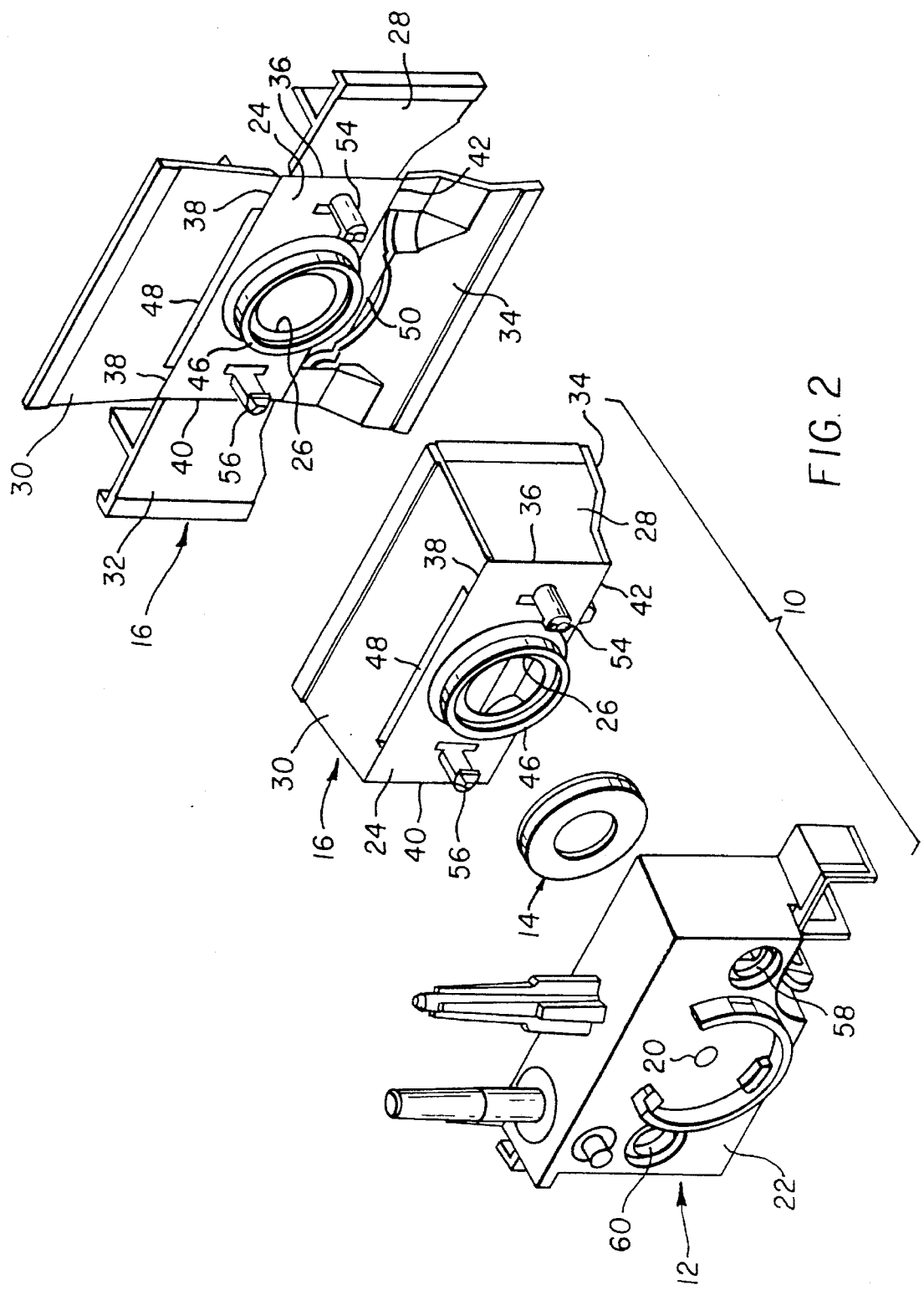
FIG. 2 is a rear exploded perspective view of the camera assemblage.

Referring now to the drawings, FIGS. 1 and 2 show a camera assemblage 10 comprising an opaque plastic front body section 12, a single-element taking lens 14 and an opaque plastic light-baffle 16.

The front body section 12 has a rectangular chamber 18 and a centered front lens opening 20 for the taking lens 14 which is open to the chamber. The front lens opening 20 is in a front wall 22 of the front body section 12 that is a front wall for the chamber 18. See FIGS. 1–3.

Figure 3:
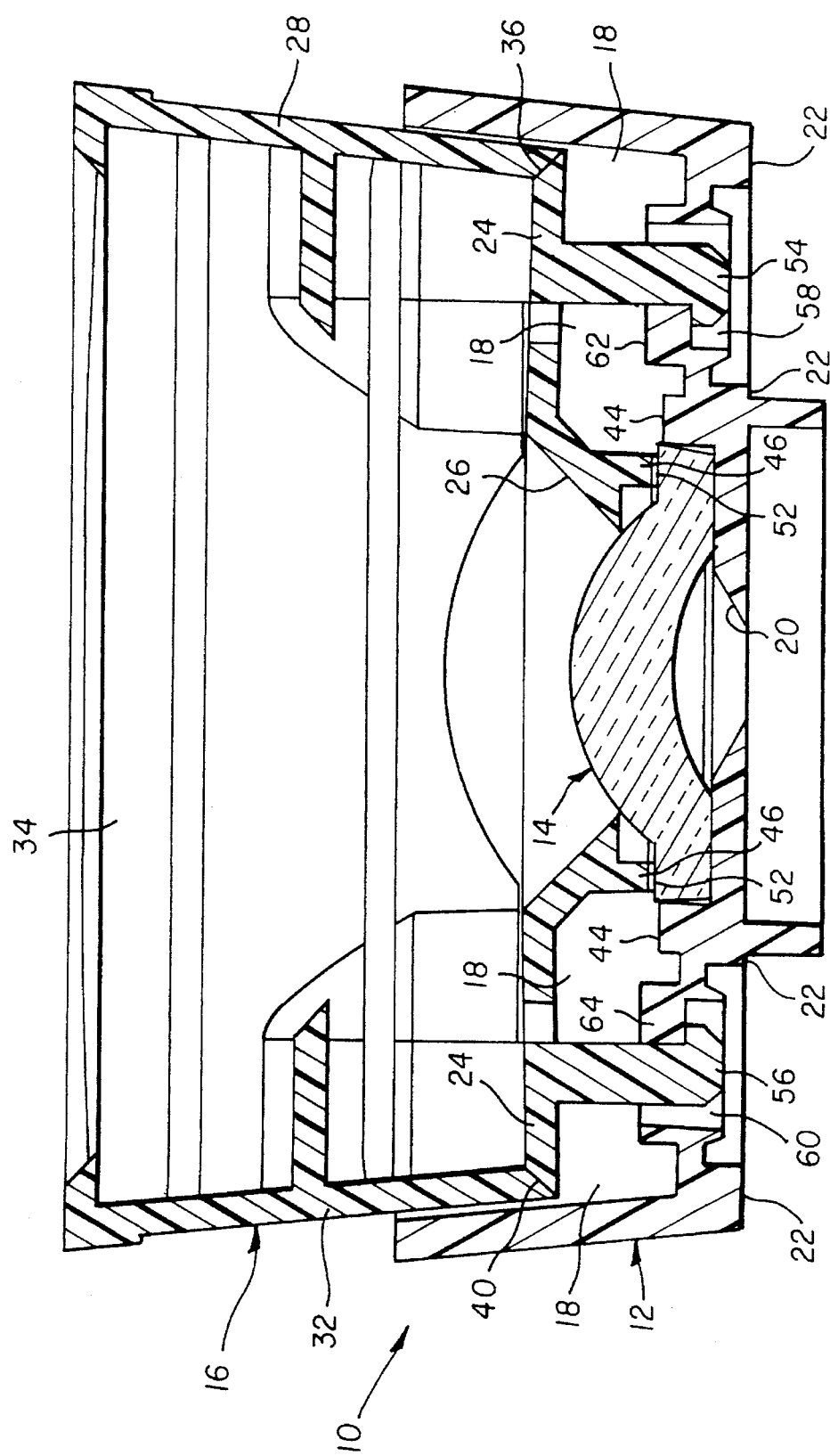
FIG. 3 is a sectional view of the camera assemblage.

The light-baffle 16 includes a resilient forward rectangular wall 24 having a centered exposure opening 26 and four side baffle panels 28, 30, 32 and 34. The four side baffle panels 28, 30, 32 and 34 are pivotably connected to the respective peripheral edges of the forward wall 24 via integral living hinges 36, 38, 40 and 42, to permit the baffle panels to be folded 90 degrees from being generally co-planar with the forward wall, to fit the light-baffle 16 snugly into the chamber 18 with the exposure opening 26 spaced behind the front lens opening 20 as shown in FIG. 3. FIGS. 1 and 2 show the light-baffle 16 with its four side baffle panels 28, 30, 32 and 34 generally co-planar with the forward wall 24 and folded 90 degrees with respect to the forward wall.

As shown in FIGS. 2 and 3, a fixed annular lens-retaining rib 44 projects slightly from the front wall 22 of the front body section 12 into the chamber 18 to form a circular nest for the taking lens 14. The lens-retaining rib 44 generally encircles the front lens opening 20 to locate the taking lens 14 in optical registration with the front lens opening as shown in FIG. 3.

An integral annular lens-clamping rim 46 projects from the forward wall 24 of the light-baffle 16. The lens-clamping rim 46 generally encircles the exposure opening 26 in the forward wall 24 as shown in FIGS. 2 and 3. A first slot 48 is longitudinally cut in the living hinge 38 and another slot 50 is longitudinally cut in the living hinge 42. See FIGS. 1 and 2. The two slots 48 and 50 in combination with the resiliency of the forward wall 24 allow the forward wall to become slightly bowed away from the taking lens 14 due to movement of the lens-clamping rim 46 against a peripheral collar 52 of the taking lens when the light-baffle 16 is fit into the chamber 18. See FIG. 3. The bowing of the forward wall 24 provides a significant counter-force to make the lens-clamping rim 46 firmly hold the taking lens 14 within the confines of the lens-retaining rib 44.

A pair of identical flexible snap-posts 54 and 56 project from the forward wall 24 of the light-baffle 16 to be partially received in corresponding retention openings 58 and 60 in the front wall 22 of the front body section 12 when the light-baffle 16 is fit into the chamber 18 as shown in FIG. 3. The two snap-posts 54 and 56 releasably engage respective lips 62 and 64 of the front body section 12 within the two openings 58 and 60, to secure the light-baffle 16 to the front body section.

The invention has been described with reference to a preferred embodiment. However, it will be appreciated that variations and modifications can be effected by a person of ordinary skill in the art without departing from the scope of the invention. For example, instead of the annular lens-clamping rim 46 being held against the peripheral collar 52 of the taking lens 14, various known means such as posts or other protuberances on the forward wall 24 of the light-baffle 16 can be used.

PARTS LIST 10. camera assemblage
12. front body section 14. taking lens
16. light-baffle
18. chamber
20. front lens opening
22. front wall
24. forward wall
26. exposure opening
28. baffle panel
30. baffle panel
32. baffle panel
34. baffle panel
36. living hinge
38. living hinge
40. living hinge
42. living hinge
44. lens-retaining rib
46. lens-clamping rim
48. slot
50. slot
52. lens collar
54. snap-post
56. snap-post
58. retention opening
60. retention opening
62. lip
64. lip

We claim:

1. A camera assemblage comprising a taking lens, a body section having a chamber and a front lens opening for said taking lens which is open to said chamber, and a light-baffle including a forward wall having an exposure opening and a plurality of baffle panels pivotably connected to said foward wall for folding to fit said light-baffle into said chamber with said exposure opening behind said front lens opening, is characterized in that:

said forward wall includes means for pressing said taking lens against said body section to clamp said taking lens within said chamber between said front lens opening and said exposure opening when said light-baffle is fit into said chamber.

2. A camera assemblage as recited in claim 1, wherein said forward wall is resilient to become bowed for said means to firmly press said taking lens against said body section when said light-baffle is fit into said chamber.

3. A camera assemblage as recited in claim 1, wherein a plurality of slots longitudinally extend between said forward wall and at least some of said baffle panels to allow the forward wall to become bowed for said means to firmly press said taking lens against said body section when said light-baffle is fit into said chamber.

4. A camera assemblage as recited in claim 1, wherein said baffle panels are pivotably connected to said forward wall at a plurality of integral living hinges, and one or more slots are longitudinally cut in at least some of said living hinges to allow the forward wall to become bowed for said means to firmly press said taking lens against said body section when said light-baffle is fit into said chamber.

5. A camera assemblage as recited in claim 1, wherein said body section has a nest for said taking lens which is integrated with said chamber, said front lens opening is centered with respect to said nest, and said forward wall is positioned for said means to hold said taking lens in said nest when said light-baffle is fit into said chamber.

6. A camera assemblage as recited in claim 1, wherein said front lens opening is located in a front wall of said body section, and said forward wall of the light-baffle is connected to said front wall of the body section for said means to clamp said taking lens within said chamber between said front lens opening and said exposure opening when said light-baffle is fit into said exposure chamber.

7. A camera assemblage as recited in claim 6, wherein said forward wall of the light-baffle is resilient to become bowed for said means to firmly press said taking lens against said body section when said light-baffle is fit into said exposure chamber.

* * * * *